Jan. 3, 1928.

F. C. GOLDSMITH

WRIST PIN

Filed April 21, 1927

1,654,586

Fred C. Goldsmith Inventor

By Jesse R. Stone

Attorney

Patented Jan. 3, 1928.

1,654,586

UNITED STATES PATENT OFFICE.

FRED C. GOLDSMITH, OF HOUSTON, TEXAS, ASSIGNOR TO W-K-M COMPANY, OF HOUSTON, TEXAS, A CORPORATION OF TEXAS.

WRIST PIN.

Application filed April 21, 1927. Serial No. 185,412.

My invention relates to the improvement in wrist pins to be employed on crank arms for connection with a pitman or similar connecting rod. It relates particularly to wrist pins employed on standard pumping and drilling rigs in oil field operations, although obviously it is not confined to this particular application.

It is an object of the invention to provide a wrist pin which may be easily secured to the crank arm upon which it is mounted and adjusted in position thereon in a positive manner. It is also desired to provide a bearing member to be employed upon the wrist pin which will assist in holding the wrist pin in position and also enable the operator to maintain a rigid connection between the wrist pin and the crank arm.

It is also an object to provide a means for lubricating the bearing on the wrist pin at any time without stopping the operation of the crank arm. It is also an object to provide a readily detachable means for securing the pitman or connecting rod with the wrist pin at any time and to avoid loosening or detachment of the bearing in use.

Other objects and advantages residing in the particular construction and arrangement of the parts will more clearly appear in the description which follows.

Figure 1:
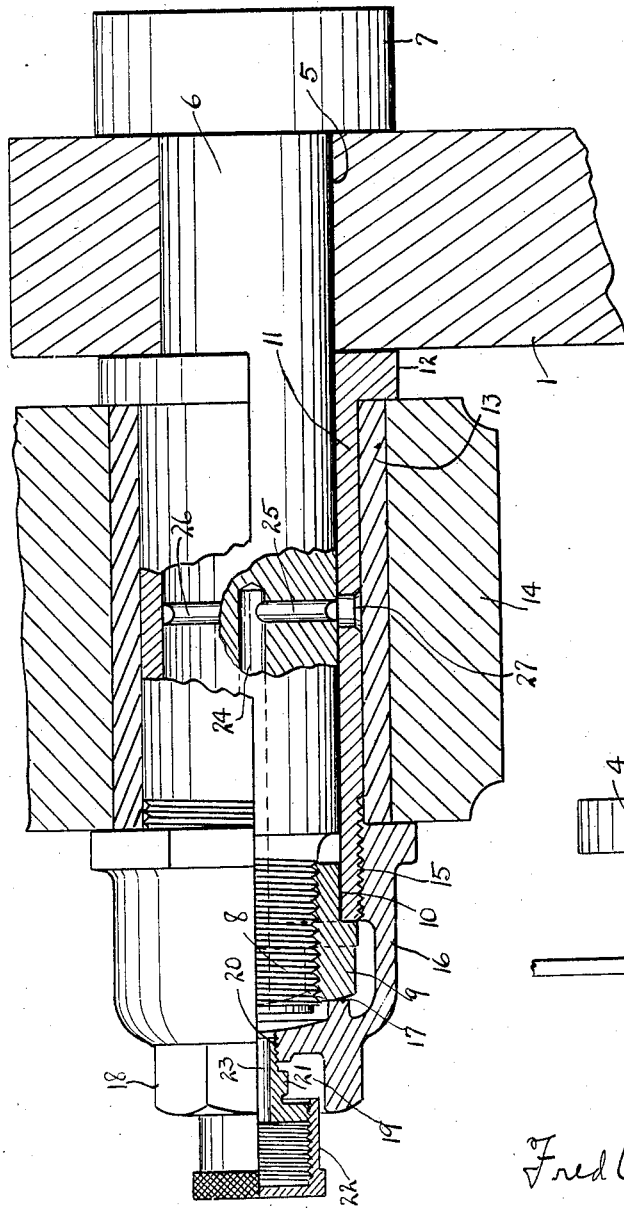
Figure 2:
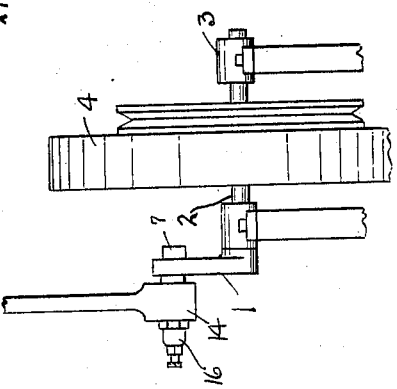

Referring to the drawing herewith, Fig. 1 is a side view, partly in elevation and partly in section, illustrating the construction of my improved wrist pin and bearing. Fig. 2 is a side elevation of a crank shaft and crank arm with my wrist pin thereon, illustrating the particular installation with which my invention is adapted to be used.

The wrist pin forming the subject matter of my invention is adapted to be employed upon a crank arm 1, mounted upon the end of a rotating crank shaft 2, supported in bearings 3. In the ordinary standard pumping and drilling rig, power is communicated to the crank shaft through a large pulley or band wheel 4, mounted thereon. Such pulley shown partly broken away is illustrated in Fig. 2.

In Fig. 1 the particular construction of the wrist pin is disclosed. The crank arm 1 is shown in central section, the opening 5 therethrough being adapted to receive the wrist pin. Said wrist pin comprises a cylindrical body 6 having a head 7 thereon to fit against the inner side of the crank arm. The pin is inserted through the opening 5 projecting outwardly from the arm in the usual manner. The outer end of the body member 6 of the pin is threaded at 8 to receive the nut 9, and it is to be understood that this nut is threaded with a left-hand thread so that in the usual rotation of the crank arm such friction as may result will tend to screw said nut more firmly on the pin and thus avoid accidental unscrewing in operation. The threaded end 8 of the pin is of smaller diameter than the body thereof and the inner end of the nut 9 on said pin is reduced in outer diameter to form a bearing surface, indicated at 10, of the same outer dimensions as the body of the pin.

Mounted upon the pin body is a bearing sleeve 11. The inner end of said sleeve which bears against the crank arm is formed with a radial flange 12. The outer face of the bearing sleeve is adapted to receive a bearing ring or collar 13 upon which the pitman head 14 may seat. The outer end of the bearing sleeve 11 is extended beyond the body of the pin and adapted to fit within the seat 10 on the inner end of the nut 9 which may be adjusted into position within the end of the sleeve, as shown in Fig. 1. The bearing sleeve is threaded at 15 beyond the bearing ring 13 to receive a threaded cap or nut 16, also adapted to screw into position upon the bearing sleeve with a left-hand rotation of said nut cap.

The nut 16 forms a cap fitting over the end of the wrist pin and the nut 9. It has an inwardly extending shoulder 17 of annular shape and adapted to contact firmly with the outer end of the nut 9 when the cap has been screwed tightly into position and thus act to prevent any movement of the inner nut 9. The outer end of the cap nut 16 is formed with a polygonal surface, as shown at 18, to receive a wrench. Within the polygonal extensions is formed a recess 19, the inner wall of which is formed with an opening threaded at 20 to receive a tubular plug 21 of a grease cup. A grease cup of ordinary construction, shown at 22, may be screwed downwardly over the end of the plug to force lubricant through a central passage 23 to the wrist pin.

The wrist pin is formed with a duct 24 leading from the outer end of said pin axially of the pin to a point approximately midway of the ends of the bearing sleeve 11, there connecting with radial ducts 25 leading to the inner surface of the bearing. The pin at this point is formed with an annular groove 26 into which the lubricant may be fed and distributed along the inner circumference of the bearing sleeve. A radial opening 27 is formed through the said bearing sleeve to communicate lubricant to the inner face of the bearing ring 13.

In mounting the wrist pin within the crank arm, the end of the pin will be inserted through the opening 5 in the crank arm from the inner side of the arm until the head 7 is in contact with the arm. The bearing sleeve 11 will then be placed in position, the bearing ring 18 and pitman head slipped over the end of the bearing sleeve into position as shown in Fig. 1. The nut 9 will then be screwed upon the end of the wrist pin until it contacts firmly with the end of the bearing sleeve, serving to draw the wrist pin into firm contact with the crank arm on both sides thereof, the end of the bearing sleeve 11 being forced tightly against the crank arm. The cap nut 16 serves to hold the bearing ring 13 and the pitman head in position upon the pin when thus screwed over the outer end of the bearing sleeve, care being taken not to clamp the pitman head too rigidly between the flange 12 of the bearing sleeve and the said nut. The bearings may be lubricated by screwing up the grease cup 22 in an obvious manner.

The advantages of this construction lie in the fact that the wrist pin may be clamped rigidly to the arm without difficulty, and it is possible where wear occurs between the wrist pin and the crank arm to quickly remove the bearing from the end of the wrist pin and free and convenient access is obtained to the wrist pin so that any play between the same and the crank arm may be repaired. The bearings are readily accessible and easily lubricated. The pitman or connecting rod may be removed from the pin by simply unscrewing the cap nut 16 and moving the pitman head off the end of the bearing. It is believed that the advantages of this construction will be apparent to those skilled in the art.

What I claim as new and desire to protect by Letters Patent is:

1. In a device of the character described including a crank arm, a wrist pin, and a pitman connected with said wrist pin; the improvement comprising a cylindrical body on said wrist pin, a head on said pin adapted to bear on the inner side of said crank arm, a bearing sleeve on said pin adapted to bear against the outer side of said crank arm, means on said pin to clamp said sleeve against said crank arm, said pitman being adapted to receive said wrist pin, and means on said bearing sleeve to retain said pitman on said sleeve and acting also to maintain said clamping means in position.

2. In a device of the character described including a crank arm, a wrist pin, and a pitman connected with said wrist pin; the improvement comprising a cylindrical body on said wrist pin, a head on said pin adapted to bear on the inner side of said crank arm, a bearing sleeve on said pin adapted to bear against the outer side of said crank arm, means on said pin to clamp said sleeve against said crank arm, said pitman being adapted to receive said wrist pin, and a cap enclosing the end of said pin and secured to said bearing sleeve to retain said pitman on said sleeve.

3. In a device of the character described including a crank arm, a wrist pin, and a pitman connected with said wrist pin; the improvement comprising a cylindrical body on said wrist pin, a head on said pin adapted to bear on the inner side of said crank arm, a bearing sleeve on said pin adapted to bear against the outer side of said crank arm, a nut on said pin fitting within said sleeve and bearing against said bearing sleeve to force said sleeve against said crank arm, and means to retain said pitman on said wrist pin.

4. In a device of the character described including a crank arm, a pitman, and a wrist pin on said arm connecting with said pitman; the improvement comprising a cylindrical body on said pin, a head thereon contacting with said crank arm, a bearing sleeve on said pin, a radial flange thereon adjacent said arm, means on said pin to clamp said bearing sleeve with said flange against said crank arm and a cap enclosing the outer end of said pin and serving to hold said clamping means in clamping position.

5. In a device of the character described including a crank arm, a pitman, and a wrist pin on said arm connecting with said pitman; the improvement comprising a cylindrical body on said pin, a head thereon contacting with said crank arm, a bearing sleeve on said pin, a radial flange thereon adjacent said arm, means on said pin to clamp said bearing sleeve with said flange against said crank arm, and a cap secured to said bearing sleeve and serving to retain said pitman on said wrist pin and to limit the movement of said means.

6. A wrist pin comprising a cylindrical body, a head thereon, a bearing sleeve on said pin, a nut on said pin adapted to force said sleeve into spaced relation to said head, a pitman head on said sleeve, means on said sleeve to retain said pitman thereon, and a cap on said sleeve enclosing the end of said pin, and bearing against said nut to limit its unscrewing movement.

7. A wrist pin comprising a cylindrical body, a head thereon, a bearing sleeve on said pin, a nut on said pin adapted to force said sleeve into spaced relation to said head, a pitman head on said sleeve, means on said sleeve to retain said pitman thereon, and a cap on said sleeve enclosing the end of said pin, and bearing against said nut to limit its unscrewing movement, said cap having a grease cup thereon adapted to deliver lubricant to said bearing sleeve in the manner described.

8. In a device of the character described a wrist pin adapted to fit within a crank arm opening, a head on said pin, a bearing sleeve on said pin, a nut on said pin adapted to clamp said crank arm between said head and said sleeve, and a cap enclosing the end of said pin and adapted to bear against said nut.

In testimony whereof I hereunto affix my signature this 5th day of April, A. D. 1927.

FRED C. GOLDSMITH.